T864019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1406

801,837

THERMOSETTING PLASTICS

Ronald George Feasey, Welwyn Garden City, England, assignor to Imperial Chemical Industries Limited, London, England, a corporation of Great Britain

Filed Feb. 24, 1969. Published July 29, 1969
Int. Cl. C08g *23/00, 33/04*
U.S. Cl. 260—49
No Drawing. 9 Pages Specification

Thermoset resins containing units of Formulae I, II and III, in such proportions that I is in molar excess of II and III is present to the extent of about two-thirds of this molar excess, may be made via a new thermosettable prepolymer from a double alkali metal salt of a dihydric phenol HO—E—OH, a dihalobenzenoid compound

X—E′—X and a polyhaloheterocyclic compound (IV) where Z is :N. or :C(X′). (X′ is halogen), such as pentachloropyridine or 2,4,6 - trichloro - 1,3,5 - triazine. Some of the alkali metal phenoxide may be omitted initially and is then added to the incomplete prepolymers for curing. The combination of the dihalobenzenoid compound with an equimolar amount of the alkali metal salt of the dihydric phenol may be replaced by an alkali metal salt of a suitable halophenol.

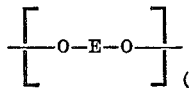

(I)

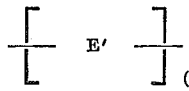

(II)

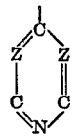

(III)

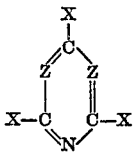

(IV)